United States Patent
Giraud et al.

(10) Patent No.: US 10,525,939 B2
(45) Date of Patent: Jan. 7, 2020

(54) SYSTEM FOR CLEANING A GLASS SURFACE OF A VEHICLE

(71) Applicant: Valeo Systèmes d'Essuyage, Le Mesnil Saint Denis (FR)

(72) Inventors: Frédéric Giraud, Le Mesnil Saint Denis (FR); Christophe Le-Ligne, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/051,835

(22) Filed: Aug. 1, 2018

(65) Prior Publication Data
US 2019/0047520 A1 Feb. 14, 2019

(30) Foreign Application Priority Data

Aug. 9, 2017 (FR) ...................................... 17 57612

(51) Int. Cl.
*B60S 1/48* (2006.01)
*H04L 12/40* (2006.01)
*H04B 3/54* (2006.01)

(52) U.S. Cl.
CPC .............. *B60S 1/481* (2013.01); *H04B 3/542* (2013.01); *H04L 12/40* (2013.01)

(58) Field of Classification Search
None
See application file for complete search history.

(56) References Cited

U.S. PATENT DOCUMENTS

| 5,327,613 A * | 7/1994 | Ohtsu | B60S 1/3411 |
| | | | 15/250.01 |
| 6,257,500 B1 * | 7/2001 | Petzold | B60S 1/481 |
| | | | 239/284.1 |
| 10,189,449 B2 * | 1/2019 | Sykula | B60S 1/485 |
| 2012/0266926 A1 | 10/2012 | Kikuta et al. | |

FOREIGN PATENT DOCUMENTS

DE 10115975 A1 10/2002
EP 3153360 A1 4/2017

OTHER PUBLICATIONS

Preliminary Search Report and Written Opinion issued in corresponding French Application No. 1757612, dated Apr. 16, 2018 (6 pages).

* cited by examiner

*Primary Examiner* — Carlos Garcia
(74) *Attorney, Agent, or Firm* — Osha Liang LLP

(57) ABSTRACT

A system for cleaning at least one glazed surface (21) comprises at least two devices (100 to 111) for projecting a cleaning product onto an associated glazed surface. The projection devices each include an electronic control module (120) configured to drive the operation of the corresponding projection device depending on control instructions, and the cleaning system includes a powerline bus common to the at least two projection devices (100 to 111), which are linked electrically to the powerline bus (11) independently of one another and in successive areas (90, 92) of said powerline bus.

15 Claims, 2 Drawing Sheets

SYSTEM FOR CLEANING A GLASS SURFACE OF A VEHICLE

Figure 1:
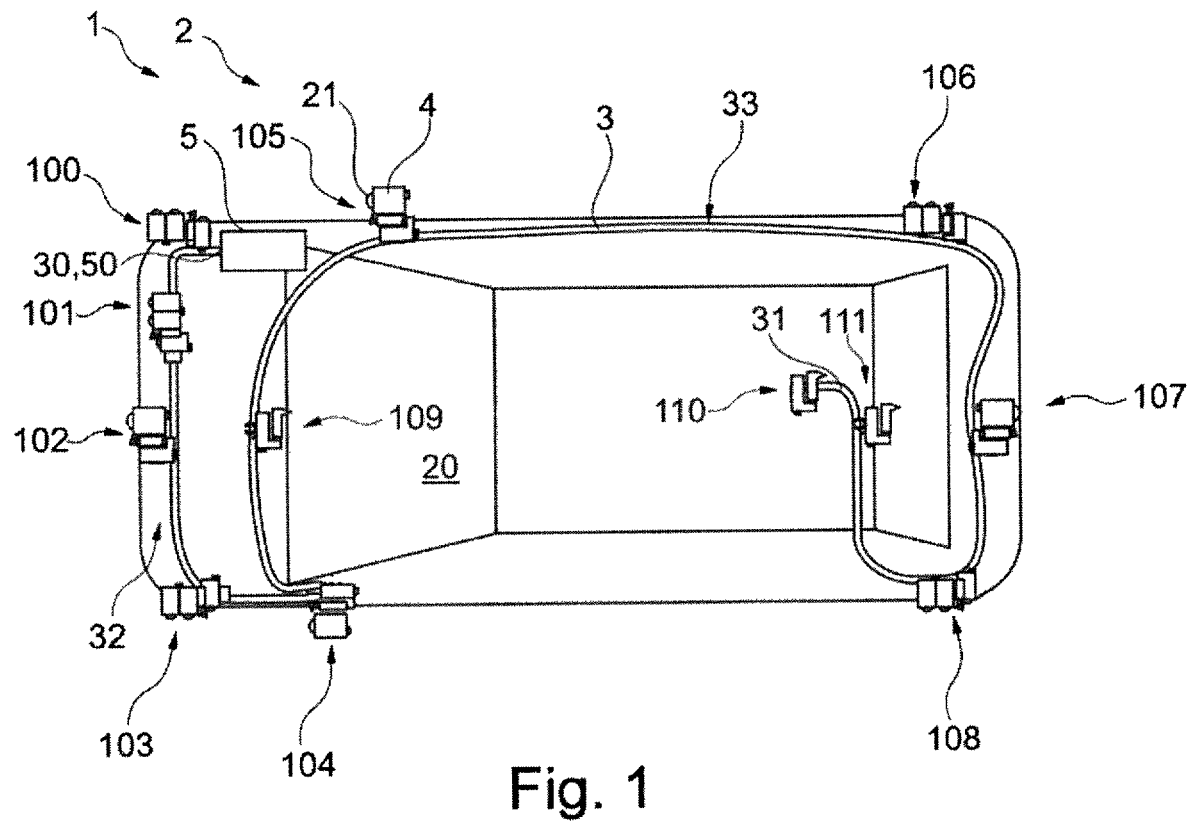

The invention relates to the field of cleaning systems fitted on motor vehicles. It relates more particularly to the field of systems for cleaning a glazed surface of such vehicles.

Document US2012/266926 describes an architecture of a cleaning system including a plurality of devices for projecting a cleaning product. These projection devices are positioned on the front face and/or on the rear face and/or on a rear-view mirror of the vehicle so as to allow an associated glazed surface to be cleaned.

In such cleaning systems, first projection devices may be actuated by a manual command triggered by a user of the vehicle, and second projection devices may be actuated by an automatic command triggered by a driving-assistance and/or manoeuvring-assistance device of this vehicle. The glazed surfaces associated with the first projection devices correspond for example to the windscreen and to the rear window of the vehicle, whereas the glazed surfaces associated with the second projection devices correspond for example to the optical surfaces of sensors intended to assist in the driving and/or in the manoeuvring of the vehicle.

To supply these projection devices with cleaning product, the architecture of the cleaning system in the document cited includes a tank and a pump that are linked to each of these projection devices via a main solenoid valve routing the cleaning product supplied by the pump to lines that are respectively associated with each of the projection devices of the vehicle. Thus, in this architecture, the projection devices are supplied by the pump of the cleaning system separately from one another, the driving of the solenoid valve directing the cleaning product pumped from the tank to one or the other of the lines.

When a cleaning system of the vehicle includes a large number of projection devices supplied by one and the same pump, the number of lines to be provided in order to link all the projection devices hydraulically is high, and may cause problems in terms of installation complexity and cost. Each of the hydraulic lines represents for example a cost per metre that greatly increases the overall cost of the cleaning system.

Moreover, each of the projection devices has to be linked electrically to a main electronic unit for controlling the cleaning function, and for example triggering the cleaning function and/or implementing deployment of the projector in order to perform this cleaning function. Again, to allow each of the projection devices to be linked electrically to the main electronic unit, it is necessary to provide a cleaning system including a large number of cables and electrical connections. A layout in which a cable is inserted between the main electronic unit and each of the projection devices again represents a cost per metre that is decisive in the overall cost of the cleaning system.

In a context of developing vehicles, for example self-driving vehicles, in which the number of sensors is becoming increasingly high on the periphery of the vehicle, it is understood that these drawbacks have to be taken into consideration.

The aim of the present invention is to mitigate at least one of the abovementioned drawbacks and to propose a cleaning system that is fitted on a vehicle and makes it possible to reduce the manufacturing cost thereof, while at the same time simplifying installation thereof in the vehicle.

To this end, the subject of the invention is a system for cleaning at least one glazed surface of a vehicle, comprising at least two devices for projecting a cleaning product onto an associated glazed surface. According to the invention, the projection devices each include an electronic control module configured to drive the operation of the corresponding projection device depending on control instructions, and the cleaning system includes a powerline bus common to the at least two projection devices, which are linked electrically to the powerline bus independently of one another and in successive areas of said powerline bus.

The following definitions are given:
'powerline bus' is understood to mean an electric control bus linked to an electric power source of the vehicle and using PLC (powerline communication) technology, which consists in configuring the frequency of the current flowing through the electric control bus in order to transmit or exchange data,
'cleaning product' is understood to mean a liquid or gaseous product able to be projected onto a glazed surface for the purpose of cleaning it, such a product being able to be, indiscriminately in the present invention, water, windscreen washer fluid, or even air,
'glazed surface' is understood to mean a transparent surface able to be one of the glazings in the passenger compartment of the vehicle and in particular a windscreen or a rear window, on the one hand, or an optical surface of an optical detection system fitted on the vehicle, on the other hand; in particular, it may be provided that the glazed surface is made of glass or else of a transparent plastic of Plexiglas type.

By virtue of the cleaning system according to the invention, it is possible to substantially reduce the overall cost of installing such a cleaning system in the vehicle. Specifically, in contrast to the architecture of known cleaning systems, only one supply and control circuit is used to supply and control each of the projection devices fitted on the vehicle, said supply and control circuit thus forming an electric control bus from which the projection devices draw current and the information necessary for the cleaning operation. The electric control bus is advantageously a powerline bus corresponding to a power source to be controlled. These projection devices are each linked electrically to this same powerline bus along the latter such that each of these projection devices is able to be supplied and controlled by the powerline bus independently of one another. It is understood that the cleaning system according to the invention is all the more beneficial when it includes a large number of projection devices, connected respectively to one and the same electric control bus, at a distance from one another along this bus running along the vehicle.

It is thus noteworthy, according to the invention, that the electrical circuits of a cleaning system fitted on a vehicle are greatly simplified. Specifically, according to the invention, the powerline bus performs the role of a supply and control bus, going along the vehicle so as to supply electric power to each of these projection devices fitted on the vehicle. The dimension and the bulk of the wires necessary to specifically link the electric control bus to each projection device are small, and the constraints for fastening the electrical circuit in the vehicle thus relate above all to the powerline bus, which is shared by each projection device.

Moreover, the electrical cables are attached regularly to structural elements of the vehicle by fasteners, be this along or through walls defining the passenger compartment for example, and it is understood that reducing the total length of the electrical cables makes it possible to reduce the number of these fasteners, and therefore the cost of the components to be provided for the installation of the cleaning system in the vehicle and the time necessary to install this system.

According to one feature of the invention, at least one of the projection devices is linked electrically to the powerline bus by way of an electrical connection element arranged on said bus. It is understood that the connection elements that are respectively present in one of the successive areas of the powerline bus are arranged at a distance from one another.

According to another feature of the invention, each of the projection devices comprises an electrical connection terminal configured to be linked to one of the electrical connection elements arranged on the powerline bus, on the one hand, and to the electronic control module, on the other hand.

The electrical connection terminal may include two electric power supply pins. These two power supply pins are configured to channel the current and the associated control instructions from the powerline bus to the projection device and its electronic control module. Preferably, the projection device and its electronic control module are supplied with a voltage of 12 V.

The powerline bus comprises a positive pole corresponding to a positive voltage, preferably equal to 12 V, and a zero pole corresponding to ground, each pole being linked to one of the pins of the electrical connection terminal of a projection device. According to one feature of the invention, the cleaning system includes pairs of electrical wires in which each wire respectively links one pin of one of the connection terminals and one of the electrical connection elements.

According to one feature of the invention, the electronic control module is configured to analyse all of the control instructions flowing through the powerline bus and to recover therefrom the control instruction(s) corresponding to its projection device.

According to one feature of the invention, each of the projection devices comprises a solenoid valve and a sprinkler, said solenoid valve being driven by the electronic control module.

When an automatic cleaning control order is received by the electronic control module via the powerline bus, the electronic control module transmits and/or generates the instruction for controlling the solenoid valve in order to allow the cleaning product to flow from the hydraulic distribution bus to the sprinkler, and where necessary to allow the sprinkler to move, in order to project the cleaning product onto the glazed surface associated therewith.

The sprinkler may be fixed or else telescopic. In other words, the projection device is configured so that the bus(es) for projecting the cleaning product keep a fixed position during and between the cleaning operations, or else that these projection buses are installed on a telescopic body able to adopt a cleaning position facing the glazed surface to be cleaned and a retracted position.

According to one feature of the invention, at least one of the projection devices is associated with an optical detection system and the projection device and the associated optical detection system are housed in a common housing.

Such an optical detection system may be an optical sensor of video camera or else laser scanner type, necessary to allow a driving-assistance and/or manoeuvring-assistance device of the vehicle to operate. The glazed surface of these sensors is then an optical surface formed by protective glass that is exposed to bad weather.

The powerline bus and the hydraulic distribution bus may be flexible. In other words, these buses may be made of an elastic material.

According to one feature of the invention, the cleaning system comprises a hydraulic distribution bus able to allow the cleaning product to flow, the at least two projection devices being linked hydraulically to the hydraulic distribution bus independently of one another. 'Hydraulic distribution bus' is understood to mean a line allowing the cleaning product to be conveyed.

It is hence possible to further reduce the overall cost of installing such a cleaning system in the vehicle. Specifically, in contrast to the architecture of known cleaning systems, only one hydraulic distribution bus is used to hydraulically supply a plurality of projection devices fitted on the vehicle. These projection devices are each linked hydraulically to this same hydraulic distribution bus along the latter such that each of these projection devices is able to be fed with cleaning product by the hydraulic distribution bus independently of one another.

Moreover, it is possible to simplify the hydraulic circuits of a cleaning system fitted on a vehicle. The hydraulic distribution bus may run along a vehicle in order to hydraulically supply each of these projection devices fitted on the vehicle. This advantageously makes it possible to optimize the space in a vehicle that is dedicated to the hydraulic circuits for such cleaning systems. In practice, the hydraulic distribution bus is attached regularly to the vehicle by fasteners. These fasteners may be common to the powerline bus.

In this context, it is possible to simplify the installation of the electrical circuits of a cleaning system fitted on a vehicle. To this end, the powerline bus may follow the path of the hydraulic distribution bus running along the vehicle in order to control and supply electric power to each of these projection devices fitted on the vehicle. This advantageously makes it possible to optimize the space in a vehicle that is dedicated to the electrical circuits for such cleaning systems.

According to one particular feature of the invention, the cleaning system comprises a single powerline bus and a single hydraulic distribution bus. The various circuits of a cleaning system fitted on a vehicle are then simplified even further.

According to one embodiment of the invention, the hydraulic distribution bus forms an open hydraulic circuit. In other words, the cleaning product flowing in the hydraulic distribution bus is at a substantially different pressure between a first end, linked to an output of the pump, of the hydraulic distribution bus and a second end, which is closed and opposite the first end, of the hydraulic distribution bus, this being the case when all of the projection devices linked to this hydraulic distribution bus are actuated.

It is possible to contemplate the hydraulic distribution bus forming a closed hydraulic circuit. In other words, the cleaning product flows in a closed loop and thus has a virtually constant pressure at the input and at the output of the hydraulic distribution bus, this being the case when all of the projection devices linked to this hydraulic distribution bus are actuated.

According to one feature of the invention, the cleaning system comprises a pump able to supply the hydraulic distribution bus with cleaning product. In particular, the pump may supply the hydraulic distribution bus by drawing cleaning product from a tank storing this product. When the hydraulic distribution bus forms a closed hydraulic circuit, a first end of the hydraulic distribution bus is linked to an output of the pump and a second end, opposite the first end, of the hydraulic distribution bus is linked to an input of the pump.

According to one feature of the invention, the hydraulic distribution bus comprises at least two portions arranged on either side of a wall and linked to one another by a hydraulic connector. This embodiment makes it possible to hydraulically link two portions of the hydraulic distribution bus extending along the vehicle and forming, according to the invention, the main distribution line, these two portions being separated by a wall of the vehicle. The hydraulic connector may be installed in an aperture formed in this wall. Such a wall may be made of metal or plastic and corresponds to a wall on the distribution path of the hydraulic distribution bus running along the vehicle in order to feed the projection devices.

One end of each portion of the hydraulic distribution bus, these ends being intended to be connected to one another, may bear a hydraulic connection port for its connection to the hydraulic connector.

In this hydraulic distribution bus context, the at least two projection devices may in particular be linked to one and the same portion of the hydraulic distribution bus, or be linked respectively to different portions of the hydraulic distribution bus. In particular, it may be provided that the distribution devices are arranged such that each portion of the hydraulic distribution bus feeds at least two distribution devices.

According to features of the invention, at least one of the projection devices comprises elements for hydraulic connection to the hydraulic distribution bus. In other words, each of the projection devices is linked to the hydraulic distribution bus by a hydraulic connection element. Also, in addition, at least one of the projection devices comprises elements for mechanical holding on the hydraulic distribution bus.

These hydraulic connection elements may be formed by syringes that are intended to pierce the hydraulic distribution bus.

According to one feature of the invention, the hydraulic connection element and the mechanical holding element of each of the projection devices may be borne by the solenoid valve. Such a solenoid valve may advantageously be linked mechanically and hydraulically to the hydraulic distribution bus in one and the same assembly operation.

In particular, the hydraulic connection element and the mechanical holding element of each of the projection devices may be borne by the housing. The housing, fitted beforehand with the projection device and with the optical detection system, may then be linked mechanically and hydraulically to the hydraulic distribution bus. The housing then forms a mechanical and hydraulic connection interface between the hydraulic distribution bus and the corresponding projection device.

According to one feature of the invention, the powerline bus and the hydraulic distribution bus form one and the same electric and hydraulic distribution bus for the projection devices. The projection devices are connected separately from one another to this electric and hydraulic distribution bus. In other words, the electric control bus is formed jointly with the hydraulic distribution bus.

By virtue of this particular embodiment, it is possible to simplify the assembly of the cleaning system in the vehicle. Thus, the projection devices may be linked hydraulically and electrically from a common part of the distribution bus.

The electric and hydraulic distribution bus may in particular be flexible. In other words, the electric and hydraulic distribution bus may be made of an elastic material.

According to one feature of the invention, the electric and hydraulic distribution bus includes an extruded tube having, in the centre of the tube, a central channel within which the cleaning product is able to flow and that has, on the periphery of the tube, lines within which each of the power supply wires of the powerline bus are able to run.

According to another feature of the invention, the electric and hydraulic distribution bus includes a tube within which the cleaning product is able to flow and within which the powerline bus also extends. The powerline bus may perform the role of a resistive wire for increasing the temperature of the cleaning product to be projected, in particular in very cold conditions. By way of example, the powerline bus may pass through the hydraulic distribution bus at the centre thereof. It will then be understood that the hydraulic distribution bus is annular, so as to receive the powerline bus in the centre thereof. In other words, the hydraulic distribution bus and the powerline bus are coaxial with respect to one another.

The powerline bus may be overmoulded on the line defining the hydraulic distribution bus.

According to one feature of the invention, the electric and hydraulic distribution bus comprises at least two portions that are linked to one another by a hydraulic and electrical connector. This particular embodiment makes it possible to electrically and hydraulically link two portions of the distribution bus that are separated by a wall of the vehicle, for example a wall defining the passenger compartment and the engine compartment. The electrical and hydraulic connector may be installed in an aperture formed in this wall.

Advantageously, one end of each portion of the electric and hydraulic distribution bus, these ends being intended to be connected to one another, bears an electrical and hydraulic connection port for its connection to the electrical and hydraulic connector.

According to other features of the invention, it may be provided that at least one first projection device is intended to clean an optical surface of a sensor used for automatic analysis of the road scene, that is to say analysis using the electronics of the vehicle in order in particular to drive a driving-assistance and/or manoeuvring-assistance device of this vehicle, and that at least one second projection device is intended to clean a glazed surface of the passenger compartment or an optical surface of a sensor used only for direct analysis by the driver of the vehicle. In this case, it is advantageous for the hydraulic distribution bus to be arranged such that the at least one second projection device is positioned on the hydraulic distribution bus, common to each of the projection devices, so as to be further away from an output of the pump supplying this hydraulic distribution bus than the at least one first projection device is.

Specifically, in particular when the hydraulic distribution bus common to all of the projection devices is an open circuit, it is understood that the cleaning product flowing at the end, furthest away from the pump, of this open circuit may exhibit a pressure lower than that of the cleaning product flowing at the pump output. Now, it is important for optical detection systems associated with driving-assistance systems to be spotless in order to avoid incorrect analysis of the road scene detected by the on-board electronics of the vehicle, whereas if the driver analyses the detected image of the road scene himself, he is better prepared to analyse the partially tainted image without making an error in judgement. Hence, it is advantageously possible to situate the second projection device on a portion of the hydraulic distribution bus where the pressure is lower, the potential risk of non-optimal cleaning having less of an impact. Moreover, by thus prioritizing the hydraulic supply of cleaning product for first and second projection devices, that is to say by situating them such that they are reached more or less rapidly by the cleaning product at the pump output, it is possible to prevent non-essential cleaning action from detracting from the triggering or the effectiveness of an action essential for the automatic processing of the information coming from the optical detection systems.

Figure 2:
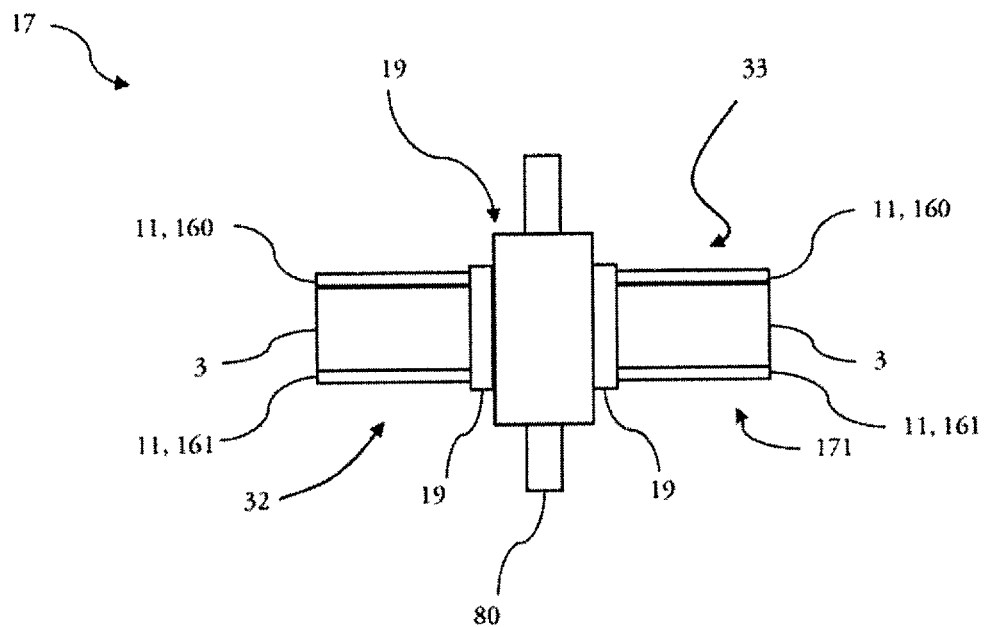
Figure 3:
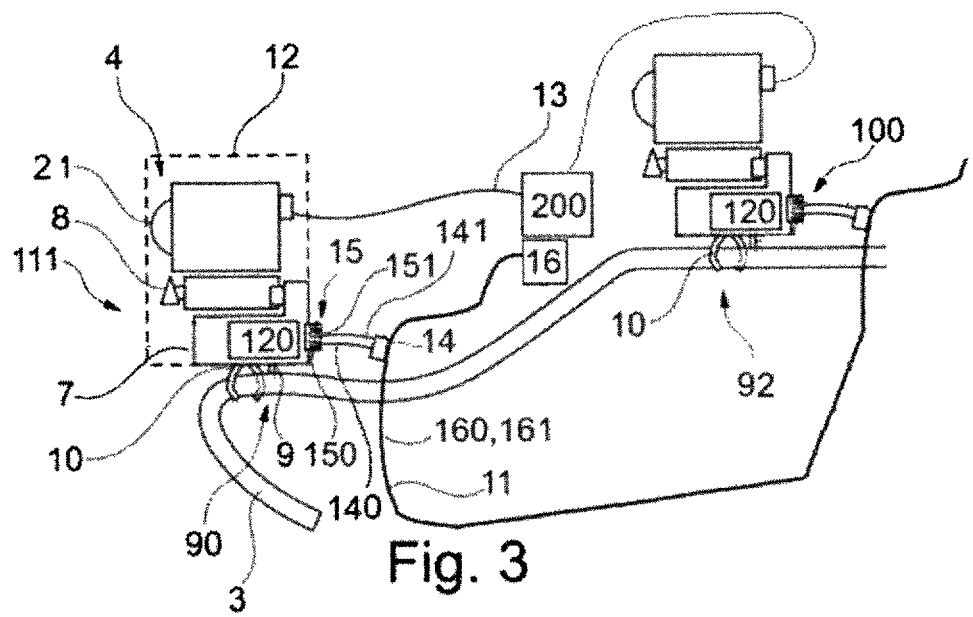
Figure 4:
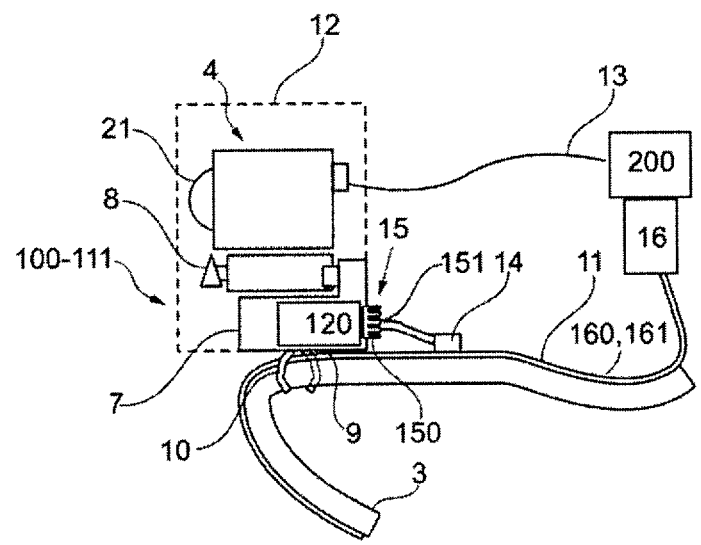
Figure 5:
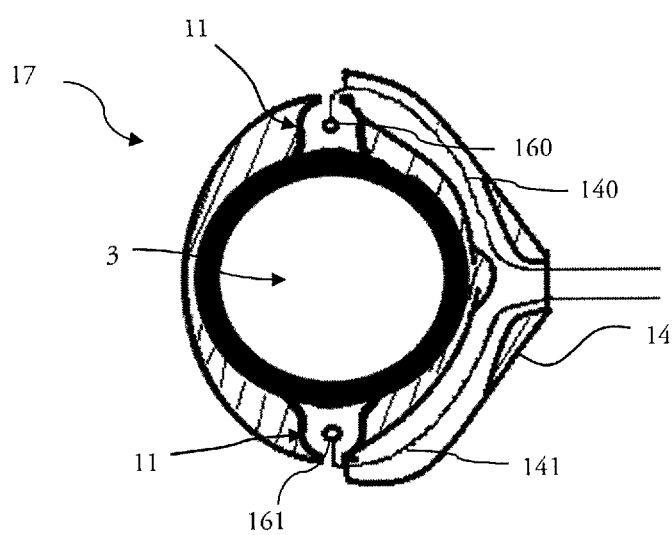

Further features, details and advantages of the invention will become more clearly apparent from reading the description given below by way of illustration and with reference to the drawings, in which:

FIG. 1 illustrates a schematic view of a motor vehicle fitted with a cleaning system according to the invention comprising a powerline bus and a hydraulic distribution bus coupled to one another and running along the vehicle in order to distribute a supply of power and control instructions, and a cleaning product, respectively, to projection devices of the cleaning system that are installed on this same vehicle, FIG. 2 illustrates a schematic view of a wall of the vehicle housing a hydraulic connector for linking two portions of the powerline bus and two portions of the hydraulic distribution bus, FIG. 3 illustrates a schematic view of one embodiment of the invention in which one of the cleaning product projection devices is linked hydraulically to the hydraulic distribution bus, on the one hand, and electrically to a powerline bus, on the other hand, the hydraulic distribution bus and the powerline bus being separate from one another, FIG. 4 illustrates a schematic view of another embodiment of the invention in which the hydraulic distribution bus and the powerline bus form one and the same electric and hydraulic distribution bus, FIG. 5 illustrates a schematic view of a section of the electric and hydraulic distribution bus illustrated in FIG. 4, in a section at an electrical connection element.

FIG. 1 shows a motor vehicle 1 fitted with a cleaning system 2 according to the invention, allowing at least one glazed surface 20, 21 of the vehicle 1 to be cleaned. Such a glazed surface may be for example a windscreen 20 or else a rear window of the vehicle, or it may be an optical surface 21 of an optical detection system 4 fitted on the vehicle 1.

The cleaning system 2 comprises devices 100 to 111 for projecting the cleaning product that are positioned in the vehicle 1 so as to be associated respectively with the cleaning of a glazed surface 20, 21, and at least one powerline bus 11 able to allow current to be supplied and control instructions to be transmitted to each of these projection devices. In the example illustrated, a projection device is dedicated specifically to cleaning a single glazed surface, but it will be understood that a plurality of projection devices could be dedicated to cleaning one and the same glazed surface, for example the windscreen 20, without departing from the context of the invention, as long as a powerline bus 11 is arranged throughout the vehicle and that a plurality of these projection devices are connected to this power supply and communication bus.

More particularly, according to the invention, each of the projection devices 100 to 111 is linked by electrical connection elements 14 to the powerline bus 11, and these projection devices are connected to this common bus independently of one another, and in separate and successive areas 90, 92 (visible in FIG. 3) of the common bus. In this nonlimiting embodiment, it will be understood that a single powerline bus provides the supply of power to and controls all of the projection devices 100 to 111 installed on this vehicle 1.

The means implemented for the electrical connection of the projection devices to a common power supply and communication bus will be described in more detail below.

With reference to FIG. 1, it should also be noted that the projection devices may be connected hydraulically, independently of one another by way of hydraulic connection elements, to a common hydraulic distribution bus 3.

The cleaning system 2 moreover comprises a pump 5 and a cleaning product storage tank. The pump 5 is configured to recover the cleaning product from the storage tank and to supply the main hydraulic line continuously with cleaning product. More particularly, an output 50 of the pump 5 is linked to a first end 30 of the hydraulic distribution bus 3. The result of this is that the hydraulic distribution bus 3 extends along the vehicle from this first end 30 to a second end 31. In the example illustrated, the second end 31, opposite the first end 30, of the hydraulic distribution bus 3 is closed such that the hydraulic distribution bus 3 forms an open hydraulic circuit. Of course, the hydraulic distribution bus could be configured in such a way as to form a closed hydraulic circuit and the second end 31 of the hydraulic distribution bus could in this context be linked to the storage tank.

With reference to FIG. 1, first projection devices 100 to 108 are intended to clean an optical surface of a sensor used for automatic analysis of the road scene, that is to say analysis using the electronics of the vehicle in order in particular to drive a driving-assistance and/or manoeuvring-assistance device of this vehicle, and second projection devices 109 to 111 are intended to clean a glazed surface of the passenger compartment or an optical surface of a sensor used only for direct analysis by the driver of the vehicle. The hydraulic distribution bus 3 is configured, in this case, such that it is one of the second projection devices, in this case a device associated with cleaning the rear window, that is positioned at the end of the hydraulic distribution bus, at the second end 31 thereof, that is to say in the area of the distribution bus furthest away from the output 50 of the pump 5.

According to the invention, the powerline bus 11 is positioned in the vehicle in order to distribute current and control instructions to each projection device, and for reasons of ease of installation and cost reduction, the powerline bus 11 advantageously runs along the hydraulic distribution bus, as will be described in particular in greater detail with reference to FIGS. 4 and 5.

The hydraulic distribution bus 3 and the powerline bus 11 in this case have, respectively, a first portion 32 arranged in the front part of the vehicle and a second portion 33 arranged in the passenger compartment, each portion winding in the corresponding part of the vehicle in order to distribute to all of the projection devices present in this part of the vehicle. It is understood that hydraulic continuity is achieved in this case between these two portions 32, 33, since a single pump 5 is provided on the distribution bus.

FIG. 2 shows a means for ensuring continuity between these portions 32, 33 when the buses 3, 11 are routed so as to pass through one or more wall(s) 80 of the vehicle 1, doing this advantageously in order to optimize the path of the buses in the vehicle 1 and thus reduce the length necessary to produce these buses common to each projection device. In this case, the portions 32, 33 are linked in pairs to one another via a hydraulic and electrical connector 19. More particularly, a first portion 32 and a second portion 33 of the buses 3, 11 each bear, at their ends facing one another, a hydraulic and electrical connection port for their connection to the connector 19. It may be provided that two projection devices 100 to 111 are linked to one and the same portion 32, 33 of the hydraulic distribution 3 and electric control 11 buses, or each to a different portion 32, 33 of the buses 3, 11.

With reference to FIG. 3, a description will now be given in greater detail of the projection devices 100 to 111 of the cleaning system 2 and their interaction with the powerline bus 11 common to at least two of these projection devices, as they have been shown schematically in this FIG. 3. In the following text, it is provided that the projection devices all have the same shape in order to facilitate standardization of the cleaning system, but it is obviously possible to adjust the shape and the dimension of a cleaning device as necessary without departing from the context of the invention, as long as, in accordance with what has been described above, each projection device is connected electrically to the common bus independently of the other projection devices.

A projection device 100 to 111 comprises at least one electronic control module 120, a solenoid valve 7 and a sprinkler 8. When the solenoid valve 7 is supplied with power and actuated, that is to say when it has received a control instruction to this effect by way of the electronic control module 120, it allows the cleaning product to pass, flowing in the hydraulic distribution bus 3 to the sprinkler 8. The cleaning product is then projected by the sprinkler 8 onto a glazed surface 20, 21 of the optical detection system 4 associated with the projection device 100 to 111. The position of the sprinkler 8 before projection of the cleaning product may be adjusted by way of movement setpoints that are generated by the electronic control module.

The projection device comprises a hydraulic connection element 9 for connecting it to the hydraulic distribution bus 3. The hydraulic connection element 9 has a form that is able firstly to pierce the hydraulic distribution bus 3 and able secondly to ensure the passage of the cleaning product from this distribution bus to the sprinkler 8. To this end, the connection element may have the tubular and tapered shape of a syringe. At the point of assembly of the hydraulic connection element 9 on the hydraulic distribution bus 3, a resin may be used to surround an area of contact between the hydraulic connection element 9 and the hydraulic distribution bus 3 in order to ensure that this area of contact is sealtight.

According to the invention, and as is visible in FIG. 3, two projection devices 100 to 111 are arranged successively along the common hydraulic distribution bus 3 so as to be connected thereto by way of these hydraulic connection elements 9 in successive separate areas. Each projection device thus pokes into the common hydraulic distribution bus as this hydraulic distribution bus is deployed in the vehicle.

The projection device comprises a mechanical holding element 10 allowing attachment to the hydraulic distribution bus 3. In the example illustrated, the mechanical holding element 10 takes the form of a clamp at least partially surrounding the main hydraulic line that contributes to forming the hydraulic distribution bus 3 common to the plurality of projection devices 100 to 111. There may for example be provision for a holding element with elastic deformation, defining, in its starting position, a groove with dimensions substantially smaller than those of the line defining the distribution bus, the operator then having to force the connection element to deform so as to be able to engage on the hydraulic distribution bus, and the elastic return of the connection element ensuring it is held in position on the bus.

FIG. 3 shows two projection devices including these hydraulic connection elements and these mechanical holding elements interacting with the hydraulic distribution bus 3.

According to the invention, and regardless of the way in which the devices are connected hydraulically, to a common hydraulic distribution bus or not, and as is visible for the two projection devices shown in FIG. 3, each projection device is linked to the powerline bus 11 by way of an electrical connection element 14, independently of the electrical connection, to this same powerline bus, of the neighbouring projection device. The projection devices are connected electrically in areas of connection that are separate from one another and arranged at a distance along the powerline bus.

The powerline bus 11 is linked electrically to a main electronic unit 200, configured in particular to encode the supply current that is routed so as to flow in the powerline bus in such a way as to use this supply current to carry control instructions for the projection device, and in particular operating instructions for the solenoid valve 7.

A description will be given hereinafter of a projection device associated with an optical detection system of optical sensor type, it being understood that the features relating to the hydraulic and electrical connection of the projection devices to a common bus may be reproduced for a projection device that is intended to clean a glazed surface such as the windscreen or the rear window.

The projection device may be housed in a housing 12, as illustrated schematically in FIG. 3. The housing 12 moreover comprises an optical detection system 4 that has a glazed surface that the associated projection device 100 to 111 has to clean. Such an optical detection system 4 fitted to the vehicle 1 may be a video camera or else a laser scanner necessary to allow a driving-assistance and/or manoeuvring-assistance device of the vehicle 1 to operate.

When a projection device 100 to 111 is associated with such an optical detection system 4, the latter is configured to communicate via an electrical connection cable 13, separate from the powerline bus 11 of the projection devices 100 to 111, with a main electronic unit 200 fitted on this vehicle 1. By way of example, when the optical detection system 4 is a camera, this electrical connection cable 13 makes it possible to transmit a video signal to the main electronic unit 200.

As was outlined above, and as illustrated in greater detail in FIGS. 3 and 4, the projection device includes at least one solenoid valve 7, a sprinkler 8, the electronic control module 120 for controlling the projection device and in particular the solenoid valve, and also an electrical connection terminal 15 configured to allow the projection device, and in particular the electronic control module and/or the solenoid valve, to be connected to the powerline bus 11 at a connector embedded on the powerline bus 11, forming an electrical connection element 14. In this way, a connection to the projection device is produced that is tapped off from the power supply and communication network, which moreover continues to run in the vehicle to the next connector and to the next associated projection device. The electrical connection element 14 consists of a tapping off of the powerline bus 11 via which two wires 140, 141 exit that are able to be linked to a first pin 151 and a second pin 152 of the electrical connection terminal 15 of the solenoid valve 7. Each wire thus comes from the powerline bus, forming part of the power supply network 16 of the vehicle, in order to electrically connect the solenoid valve to a positive pole 160, for a voltage preferably equal to 12 V, and a zero pole 161 for grounding.

The particularity of the powerline current flowing in the common bus 11 for supplying power respectively to each of the projection devices makes it possible to transmit, to the electronic control modules associated with the solenoid valves in each projection device, operating instructions by superposing a frequency-modulated signal on the current that is flowing.

As soon as one of the projection devices has to be used, following the detection of the exceedance of a soiling threshold of the associated glazed surface, the main electronic unit 200 encodes the current flowing in the bus 11 in order to propagate a frequency-modulated signal along the bus to the projection devices. Each projection device sees this frequency-modulated signal transit, and only the projection device for which this signal is intended takes it into consideration, the encoding being specific to each projection device.

In other words, the electronic driving unit for a solenoid valve 7 is linked electrically to the electrical connection terminal 15. This electronic driving unit is programmed to continuously analyse the data transmitted by the powerline bus 11. When this electronic driving unit identifies an instruction emitted by the main electronic unit 200, transmitted via the powerline bus 11 and that is dedicated thereto, for example a control instruction to open the solenoid valve 7, it actuates the solenoid valve 7 that is associated therewith and thus allows the cleaning product contained in the hydraulic distribution bus 3 to be directed to the corresponding sprinkler 8.

The projection device then recovers as much cleaning product as is required to clean the associated glazed surface, that is to say the amount of cleaning product flowing through the solenoid valve for the time it is actuated by the electronic driving unit.

FIG. 4 schematically shows the hydraulic distribution bus 3 and the powerline bus 11 forming a single electric and hydraulic distribution bus 17, which, in accordance with what was described above, is configured to feed a plurality of projection devices 100 to 111. As shown, the powerline bus 11 is formed jointly with the hydraulic distribution bus 3. FIG. 5 shows a section of this electric and hydraulic distribution bus 17, which in this case is formed such that the hydraulic distribution bus 3 takes the form of an extruded tube within which the cleaning product flows and that bears, on its periphery, at least one additional line for receiving the powerline bus 11, which is thus positioned peripherally with respect to the hydraulic distribution bus 3. In this FIG. 5, there is moreover the electrical connection element 14, which makes it possible to bring together the wires 140, 141 stemming from the positive 160 and zero 161 poles of the powerline bus 11, and therefore to allow them to be connected to the electrical connection terminal 15 associated with the projection device.

In one variant that is not illustrated, it may be provided that the powerline bus runs through the centre of the tube forming the hydraulic distribution bus. In particular, the tube may be annular, so as to receive the powerline bus in the centre thereof. In this configuration, just like in the one above, the powerline bus may perform the role of a resistive wire for increasing the temperature of the cleaning product to be projected through thermal conduction, in particular in very cold conditions.

When a projection device 100 to 111 is linked hydraulically to the hydraulic distribution bus 3, the hydraulic connection element 9 is advantageously positioned on the electric and hydraulic distribution bus 17 so as not to damage the powerline bus 11.

It will have been understood from reading the above text that the cleaning system according to the invention is advantageous in that it includes at least two cleaning devices positioned at a distance from one another in the vehicle and supplied at least electrically by an electrical distribution bus, of powerline bus type, that is common to these cleaning devices. The distribution bus is arranged throughout the vehicle so as to route, close to the cleaning devices, the electricity necessary for the solenoid valves specific to each of these cleaning devices to operate, and also activation commands for these solenoid valves, and it is noteworthy according to the invention that these cleaning devices draw on the current and the information flowing in the common bus in order to operate, independently of the nearby cleaning devices.

Of course, the features and the variant embodiments of the invention may be combined with one another, in numerous combinations, as long as they are not incompatible or exclusive with respect to one another. It may be possible in particular to contemplate variants of the invention that comprise only a selection of features described below, in isolation from the other features described, if this selection of features is sufficient to confer a technical advantage or to distinguish the invention from the prior art.

The invention claimed is:

1. A system for cleaning at least one glazed surface of a vehicle, comprising:
   at least two projection devices for projecting a cleaning product onto an associated glazed surface,
   wherein the projection devices each include an electronic control module configured to drive the operation of the at least two projection devices depending on control instructions; and
   a powerline bus common to the at least two projection devices, which are linked electrically to the powerline bus independently of one another and in successive areas of said powerline bus.

2. The cleaning system according to claim 1, wherein at least one of the projection devices is linked electrically to the powerline bus by way of an electrical connection element arranged on said bus.

3. The cleaning system according to claim 2, wherein each of the projection devices comprises an electrical connection terminal configured to be linked to one of the electrical connection elements arranged on the powerline bus, and to the electronic control module.

4. The cleaning system according to claim 3, wherein the electrical connection terminal comprises two electric power supply pins.

5. The cleaning system according to claim 4, further comprising pairs of electrical wires in which each wire respectively links one pin of one of the connection terminals and one of the electrical connection elements.

6. The cleaning system according to claim 1, wherein the electronic control module is configured to analyse all of the control instructions flowing through the powerline bus and to recover therefrom the control instruction(s) corresponding to its projection device.

7. The cleaning system according to claim 6, wherein each of the projection devices comprises a solenoid valve and a sprinkler, said solenoid valve being driven by the electronic control module.

8. A system for cleaning at least one glazed surface of a vehicle, comprising:
   at least two projection devices for projecting a cleaning product onto an associated glazed surface,
   wherein the projection devices each include an electronic control module configured to drive the operation of the at least two projection devices depending on control instructions; and a powerline bus common to the at least two projection devices, which are linked electrically to the powerline bus independently of one another and in successive areas of said powerline bus, wherein at least one of the projection devices is associated with an optical detection system, the projection device and the associated optical detection system being housed in a common housing.

9. A system for cleaning at least one glazed surface of a vehicle, comprising:

at least two projection devices for projecting a cleaning product onto an associated glazed surface, wherein the projection devices each include an electronic control module configured to drive the operation of the at least two projection devices depending on control instructions;

a powerline bus common to the at least two projection devices, which are linked electrically to the powerline bus independently of one another and in successive areas of said powerline bus; and a hydraulic distribution bus able to allow the cleaning product to flow, the at least two projection devices being linked hydraulically to the hydraulic distribution bus independently of one another.

10. The cleaning system according to claim 9, wherein at least one of the projection devices comprises elements for hydraulic connection to the hydraulic distribution bus.

11. The cleaning system according to claim 9, wherein at least one of the projection devices comprises elements for mechanical holding on the hydraulic distribution bus.

12. The cleaning system according to claim 9, wherein the powerline bus and the hydraulic distribution bus form one and the same electric and hydraulic distribution bus for the projection devices.

13. The cleaning system according to claim 12, wherein the electric and hydraulic distribution bus includes an extruded tube having, in the centre of the tube, a central channel within which the cleaning product is able to flow and that has, on the periphery of the tube, lines within which each of the power supply wires of the powerline bus are able to run.

14. The cleaning system according to claim 12, wherein the electric and hydraulic distribution bus includes a tube within which the cleaning product is able to flow and within which the powerline bus also extends.

15. The cleaning system according to claim 12, wherein the electric and hydraulic distribution bus comprises at least two portions that are linked to one another by a hydraulic and electrical connector.

* * * * *